United States Patent
Suparna et al.

(10) Patent No.: US 10,228,936 B2
(45) Date of Patent: Mar. 12, 2019

(54) SOFTWARE DELIVERY PIPELINE MANAGEMENT

(71) Applicant: Hewlett Packard Enterprise Development LP, Houston, TX (US)

(72) Inventors: Adarsh Suparna, Bangalore (IN); Gajanan Rameshwar More, Bangalore (IN); Paramjot Singh, Amritsar (IN)

(73) Assignee: EntIT Software, LLC, Sanford, NC (US)

( * ) Notice: Subject to any disclaimer, the term of this patent is extended or adjusted under 35 U.S.C. 154(b) by 10 days.

(21) Appl. No.: 15/381,250

(22) Filed: Dec. 16, 2016

(65) Prior Publication Data
US 2018/0173525 A1 Jun. 21, 2018

(51) Int. Cl.
G06F 8/77 (2018.01)
G06F 8/60 (2018.01)
G06F 11/36 (2006.01)
G06F 8/00 (2018.01)

(52) U.S. Cl.
CPC ............ G06F 8/77 (2013.01); G06F 8/00 (2013.01); G06F 8/60 (2013.01); G06F 11/36 (2013.01); G06F 11/3688 (2013.01)

(58) Field of Classification Search
CPC ..... G06F 8/77; G06F 8/00; G06F 8/60; G06F 11/36; G06F 11/3688
USPC ......................................................... 717/124
See application file for complete search history.

(56) References Cited

U.S. PATENT DOCUMENTS

| 9,329,981 | B2* | 5/2016 | Mizobuchi | G06F 11/3688 |
| 2006/0195436 | A1* | 8/2006 | Levesque | G06F 8/71 |
| 2007/0169090 | A1* | 7/2007 | Kang | G06F 8/65 717/168 |
| 2009/0300586 | A1* | 12/2009 | Bernardini | G06F 8/36 717/126 |
| 2015/0088834 | A1* | 3/2015 | Wright, Sr. | G06F 17/30377 707/689 |
| 2015/0229518 | A1* | 8/2015 | Ennis | H04L 41/0806 709/224 |
| 2018/0157466 | A1* | 6/2018 | Jubran | G06F 8/00 |
| 2018/0173525 | A1* | 6/2018 | Suparna | G06F 8/77 |

FOREIGN PATENT DOCUMENTS

WO WO 2017015036 A1 * 1/2017 ............... G06F 8/52

OTHER PUBLICATIONS

Ireland, "Software Engineering 4: The Software Testing Life-Cycle", School of Mathematical and Computer Sciences Heriot-Watt University Edinburgh, 2016.*
EPO: Extended Search Report; 17196395.2-1224; dated Apr. 26, 2018; 9 pages.

* cited by examiner

Primary Examiner — Hossain M Morshed

(57) ABSTRACT

Examples described relate to managing a software delivery pipeline. In an example, a modified software may be identified. Further, a modification in the modified software may be identified. Further, a type of the modification may be identified. Further, a stage of a software delivery pipeline management system may be identified based on the type of the modification. Further, the modified software may be placed in the identified stage of the software delivery pipeline management system.

11 Claims, 4 Drawing Sheets

SOFTWARE DELIVERY PIPELINE MANAGEMENT

BACKGROUND

DevOps (development and operations) may refer to a software development phrase or practice that emphasizes collaboration and communication between development and IT production teams. It aims at establishing a culture and environment where building, testing, and releasing software may happen rapidly, frequently, and more reliably. DevOps advocates synchronization between development teams and IT teams from the first phase of software development till the software is deployed.

BRIEF DESCRIPTION OF THE DRAWINGS

For a better understanding of the solution, examples will now be described, purely by way of example, with reference to the accompanying drawings, in which.

DETAILED DESCRIPTION

In recent years, unification of development and operations teams (called DevOps) for development of software has been advocated. DevOps encourages removal of barriers between development (Dev) and operations (Ops) team to speed up the release of software.

In a typical DevOps environment, an application may first be built using a build system. The build artifacts may be packaged and delivered to various groups in an organization for deploying and testing. These packages may follow a pipeline. For example, the package may first be placed in a development environment by developers, then in a testing environment by a Quality Assurance (QA) team, later in a staging environment by an IT release team, and so on so forth. Thus, an application may be placed and tested in various environments before it is released. During the process, an application may pass through a rigorous process during which various tests may be executed in different environments. This process may be repeated every time for all new builds or packages. In an example, the entire software development process may be managed using a software delivery pipeline management system.

One of the challenges with an existing approach to the software development pipeline process is that there is no mechanism to target specific packages for specific lifecycle stages. Every package may follow the same pre-defined pipeline. For example, if a package is to be tested for a security fix, it may undergo tests associated with the prior stages (for example, development, QA, performance, etc.) of the pipeline before security-related tests are performed. Testing each package at each of the pre-defined stages in the pipeline may not be desirable since it may strain system resources (e.g., memory, processors, etc.), which, if released, may be utilized for performing other system-related tasks or processes.

To address these technical challenges, the present disclosure describes various examples for managing a software delivery pipeline. In an example, a modification in a modified software may be identified from metadata associated with the modified software. Further, a type of modification in the modified software may be identified. Later, a stage in a software delivery pipeline management system may be identified for testing the modified software based on the type of the modification. In an example, software delivery pipeline management system may manage various stages of a software development process of software, including the modified software. Once the stage is identified, the modified software may be placed in the identified stage of software delivery pipeline management system, for example, for performing a test(s) associated with the identified stage. The examples described herein propose an approach in which a target environment of a software development process may be identified for a modified software based on the type of modification.

Figure 1:
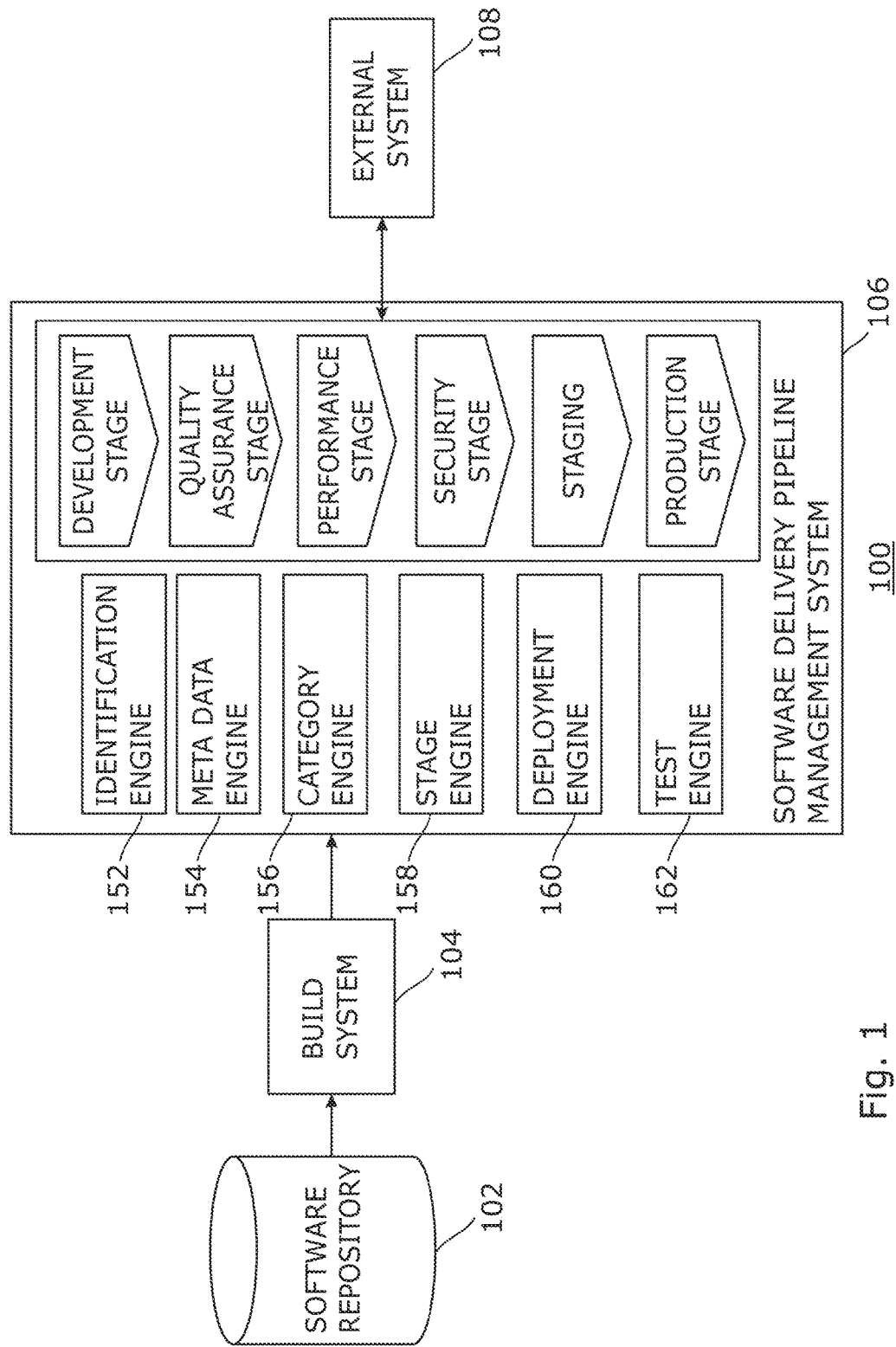
FIG. 1 is a block diagram of an example computing environment for managing a software delivery pipeline.

FIG. 1 is a block diagram of an example computing environment 100 for managing a software delivery pipeline. In an example, computing environment 100 may include a software repository 102, a build system 104, a software delivery pipeline management system 106, and an external system 108. Although one software repository, one build system, and one external system are shown in FIG. 1, other examples of this disclosure may include more than one software repository, more than one build system, and more than one external system.

Software repository 102 may be a computing device (e.g., includes at least one processor), a storage device, or a combination thereof. The computing device may represent any type of system capable of executing machine-readable instructions. Examples of the computing device may include a server, a desktop computer, a notebook computer, a tablet computer, a thin client, a mobile device, a personal digital assistant (PDA), and the like. The storage device may be an internal storage device, an external storage device, or a network attached storage device. Examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Network Attached Storage (NAS) device, a Redundant Array of Inexpensive Disks (RAID), a data archival storage system, or a block-based device over a storage area network (SAN). In one example, the storage device may be a storage array, which may include one or more storage drives (for example, hard disk drives, solid state drives, etc.).

Software repository 102 may store software (machine-readable instructions). The software may include application software (e.g., a computer application), firmware, or system software (e.g., operating system, utility software, etc.). In an example, a user (for example, a developer) may modify software and store a modified software in software repository 102. A modification in the modified software may relate to, for example, a performance of the software, a quality of the software, a feature of the software, and a security aspect of the software.

In an example, while storing a modified software in software repository 102, a user may provide a comment(s) related to the modification(s) performed on the software. In an example, a user comment may be provided via a user interface of an application. For example, if a security-related fix has been applied to the software, the user may provide user comments related thereto. For example, a user may provide a comment such as "@UIModule Defect 712", which may be related to a User Interface engine of the software. In another example, a user may provide a multiple or a combination of comments such as "@UIModule Defect 1712, @DBModule Bug 1892", which may relate to different fixes applied to the software.

In another example, instead of providing user comments, a user may select a pre-defined comment(s) from a pre-defined selection to describe a modification(s) carried out to the software. The pre-defined selection may be provided via a user interface of an application. For example, a pre-defined numerical code "1234", which may be related to a security-related modification, may be selected by a user to describe a security-related fix made to software. In some examples, other forms of representations may be used to describe a modification. A user may select one or more of those representations to highlight a modification(s) made to the software.

In another example, both user comments and pre-defined comments related to a modification(s) performed on the software may be provided.

In an example, a user comment(s) or a pre-defined comment(s) related to a modification(s) performed on the software may be associated with the modified software as metadata. In an example, the metadata may be stored along with the modified software in software repository 102.

Build system 104 may include a software tool(s) designed to automate the process of program compilation. Build system 104 may be used for various software build tasks, which may include, by way of example, compiling of computer source code into binary code, packaging of binary code, and running of automated tests. Build system 104 may map a set of source resources (e.g., files) to a target (executable). In an example, build system 104 may be present on a computing device, similar to the computing device described above (for example, a server). In an example, build system 104 may be used to generate software builds for software (including a modified software) stored in software repository 102.

Software delivery pipeline management system 106 may include software, a hardware, or a combination thereof. In an example, software delivery pipeline management system 106 may include a computing device, similar to the computing device described above (for example, a server).

In an example, software delivery pipeline management system 106 may manage various stages of a software development process of software, including a modified software, which may be stored, for example, in software repository 102. As used herein, software delivery pipeline management system 106 may refer to an automated management of a software development process, from building software through testing and deployment. Software delivery pipeline management system 106 may break down the software delivery process into various stages. These stages may include, for example, a development stage, a quality assurance stage, a performance testing stage, a security testing stage, a staging stage, and a production stage. Each stage of the software development process may be used, for example, to verify a feature(s) of software (including a modified software) from various perspectives (e.g., security, quality, performance, etc.) in order to validate a functionality and/or prevent errors. In an example, the modified software may include a build or package generated by build system 104. Each stage of the software development process in software delivery pipeline management system 106 may follow a sequence. An example sequence may include: a development stage→a quality assurance stage→a performance testing stage→a security testing stage→a staging stage→a deployment or production stage. The aforementioned sequence of stages may vary in other examples. After a stage is completed, the process may proceed to the next stage in the sequence.

A test or a plurality of tests for testing software may be associated with each stage of the software development process in software delivery pipeline management system 106. For example, performance-related tests may be associated with the performance stage; security-related tests may be associated with the security stage; and quality-related tests may be associated with the quality stage in software delivery pipeline management system 106.

External system 108 may include software, a hardware, or a combination thereof. In an example, external system may include a computing device, similar to the computing device described above (for example, a server). In another example, external system 108 may include a storage device, similar to the storage device described above (for example, a storage array). In an example, external system 108 may be a repository that includes a test(s), test scripts, configuration files, etc. that may be performed on a modified software. Examples of the external system 108 may include an agile project management system, an agile lifecycle management system, an application quality management system, an application security management system, and an application performance management system.

Software repository 102, build system 104, software delivery pipeline management system 106, and external system 108 may be communicatively coupled, for example, via a computer network. Computer network may be a wireless or wired network. Computer network may include, for example, a Local Area Network (LAN), a Wireless Local Area Network (WAN), a Metropolitan Area Network (MAN), a Storage Area Network (SAN), a Campus Area Network (CAN), or the like. Further, computer network may be a public network (for example, the Internet) or a private network (for example, an intranet).

In an example, software delivery pipeline management system 106 may include an identification engine 152, a metadata engine 154, a category engine 156, a stage engine 158, a deployment engine 160, and a test engine 162.

Engines 152, 154, 156, 158, 160, and 162 (described below) may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of software delivery pipeline management system 106. In some examples, the at least one machine-readable storage medium may store instructions that, when executed by the at least one processing resource, at least partially implement some or all engines of the computing device. In such examples, software delivery pipeline management system 106 may include the at least one machine-readable storage medium storing the instructions and the at least one processing resource to execute the instructions.

Identification engine 152 may identify software stored in a repository, for example, software repository 102. In an example, the software may include a modified software.

In response to identifying a modified software by identification engine 152, metadata engine 154 may identify a modification in the modified software from metadata associated with the modified software. As mentioned earlier, the metadata may include user comments (e.g., "@UIModule Defect 712") and/or pre-defined comments describing a modification(s) made to the modified software. Metadata engine 154 may identify such user comments and/or pre-defined comments from the metadata. For example, if the metadata includes a pre-defined code "1234", metadata engine 154 may identify the code from the metadata. Likewise, other forms of representations describing a modification(s), which may be present in the metadata, may be identified by metadata engine 154.

In response to identifying the modification(s) in the modified software by metadata engine 154, category engine 156 may identify a type(s) of the modification(s). For example, if a modification relates to a security fix, category engine 156 may identify "security" as the type. In other example, if a modification pertains to a performance parameter, category engine 156 may identify "performance" as the type. In an example, category engine 156 may identify more than one type depending on the modification(s) in a modified software.

Once a type of the modification in the modified software is identified by category engine 156, stage engine 158 may identify a stage of software delivery pipeline management system 106 for deploying the modified software based on the type of the modification. Stage engine 158 may maintain, in a storage device, a mapping between a type of modification and a stage of software delivery pipeline management system 106. Stage engine 158 may refer to the mapping for determining a stage of software delivery pipeline management system 106 that corresponds to the identified type of modification. For example, if "security" is identified as the type, stage engine 158 may identify "security stage" in software delivery pipeline management system 106 for deploying the modified software. In another example, if "performance" is identified as the type, stage engine 158 may identify "performance stage" in software delivery pipeline management system 106 for deploying the modified software. In a yet another example, if "quality" is identified as the type, stage engine 158 may identify "QA stage" in software delivery pipeline management system 106 for deploying the modified software.

In an example, stage engine 158 may identify more than one stage of software delivery pipeline management system 106 for deploying the modified software.

Once a stage of software delivery pipeline management system 106 is identified by stage engine 158, deployment engine 160 may deploy the modified software in the identified stage. For example, if "security stage" of software delivery pipeline management system 106 is identified for deploying the modified software by stage engine 158, deployment engine 160 may deploy the modified software therein. In another example, if "performance stage" of software delivery pipeline management system 106 is identified for deploying the modified software by stage engine 158, deployment engine 160 may deploy the modified software therein.

In an example, if stage engine 158 identifies more than one stage of software delivery pipeline management system 106 for deploying the modified software, deployment engine 160 may successively deploy the modified software through the identified stages in software delivery pipeline management system 106 beginning with a stage among the identified stages that is earliest in software delivery pipeline management system 106. For example, if stage engine 158 identifies "performance stage" and "security stage" of software delivery pipeline management system 106 where the modified software may be deployed, deployment engine 160 may successively deploy the modified software through the two identified stages beginning with the stage that is earliest in software delivery pipeline management system 106.

One benefit of the present disclosure is that deployment engine 160 may deploy a modified software to an identified stage of software delivery pipeline management system 106 directly. Thus, deployment engine 160 may bypass deployment of the modified software to stages prior to the identified stage in software delivery pipeline management system 106. In another example, once a stage for deploying a modified software is identified by stage engine 158, deployment engine 160 may deploy the modified software from a current stage of software delivery pipeline management system 106 to the identified stage of software delivery pipeline management system 106, and skip any stages that may exist between the current stage and the identified stage.

In an example, once deployment engine 160 deploys the modified software in the identified stage of software delivery pipeline management system 106, test engine 162 may identify and/or perform a test(s) associated with the identified stage on the modified software. For example, if deployment engine 160 deploys the modified software in the "security stage" of software delivery pipeline management system 106, test engine 162 may perform a test(s) associated with the security stage on the modified software. In another example, if deployment engine 158 deploys the modified software in the "performance stage" of software delivery pipeline management system 106, test engine 162 may perform a test(s) associated with the performance stage on the modified software.

In an example, test engine 162 may use an external system (for example, 108) to perform a test on the modified software. As mentioned earlier, external system 108 may store tests that may be performed on the modified software. Such tests may be associated with various stages of software delivery pipeline management system 106. Test engine 162 may send a request to external system 108 to perform a test on the modified software. In an example, the request may include metadata associated with the modified software. In response, external system 108 may identify a test(s) to be performed on the modified software from the request. In an example, the test(s) may be associated with a stage of software delivery pipeline management system 106 where the modified software is deployed. In an example, external system 108 may perform the identified test(s) on the modified software. Software delivery pipeline management system 106 may receive a notification in this regard from external system 108.

In an example, test engine 162 may skip carrying out tests associated with the remaining stages of software delivery pipeline management system 106 on the modified software other than those that are associated with the stage where the modified software is deployed. After the tests associated with the identified stages are performed, the modified software may be released. This may help speed up the deployment of the modified software, as tests that may not be relevant to the update may be avoided.

Figure 2:
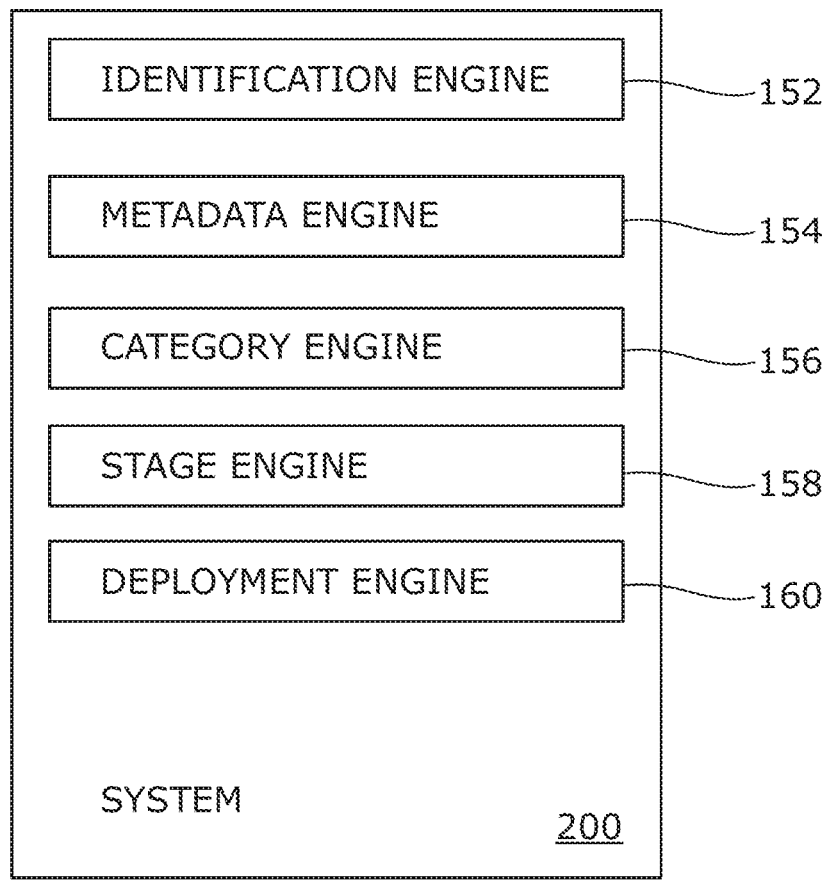
FIG. 2 is a block diagram of an example computing system for managing a software delivery pipeline.

FIG. 2 is a block diagram of an example computing system 200 for managing a software delivery pipeline. In an example, computing system 200 may be analogous to software delivery pipeline system 106 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, system 200 may represent any type of computing device capable of reading machine-executable instructions. Examples of computing device may include, without limitation, a server, a desktop computer, a notebook computer, a tablet computer, a thin client, a mobile device, a personal digital assistant (PDA), and the like.

In an example, system 200 may include an identification engine 152, a metadata engine 154, a category engine 156, a stage engine 158, and a deployment engine 160.

In an example, identification engine 152 may identify a modified software. Metadata engine 154 may identify a modification in the modified software from metadata associated with the modified software. Category engine 156 may identify a type of the modification. Stage engine 158 may identify a stage of a software delivery pipeline management system 106 based on the type of the modification. In an example, software delivery pipeline management system 106 may manage various stages of a software development process of software, including the modified software. Deployment engine 160 may deploy the modified software in the identified stage of software delivery pipeline management system.

Figure 3:
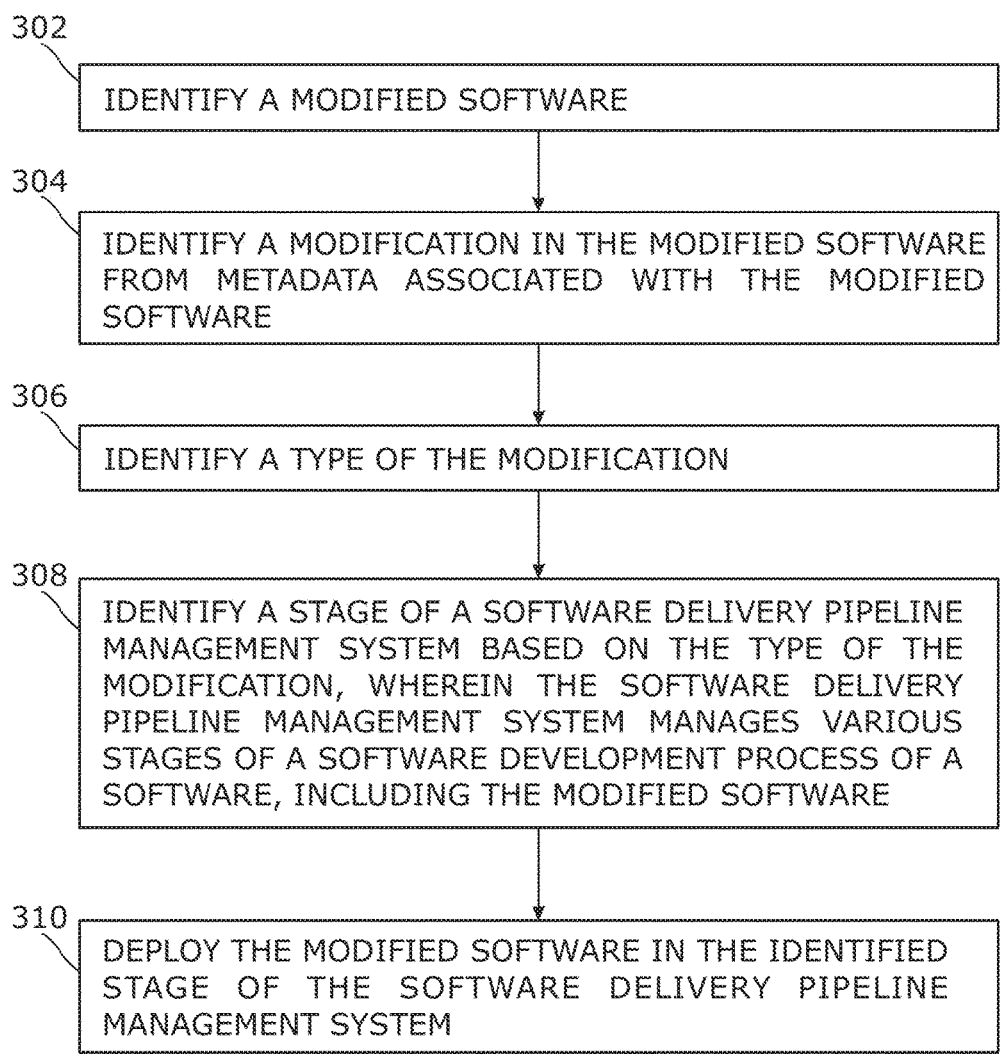
FIG. 3 is a flowchart of an example method of managing a software delivery pipeline.

FIG. 3 is a flowchart of an example method 300 of managing a software delivery pipeline. The method 300, which is described below, may be executed on a computing device such as software delivery pipeline management system 106 of FIG. 1 or system 200 of FIG. 2. However, other computing devices may be used as well. At block 302, a modified software may be identified, for example, by identification engine 152. At block 304, a modification in the modified software may be identified, for example, by metadata engine 154 from metadata associated with the modified software. At block 306, a type of the modification may be identified, for example, by category engine 156. At block 306, a stage of a software delivery pipeline management system 106 may be identified, for example, by stage engine, based on the type of the modification. In an example, software delivery pipeline management system 106 may manage various stages of a software development process of software, including the modified software. At block 308, the modified software may be placed in the identified stage of software delivery pipeline management system, for example, by deployment engine 160.

Figure 4:
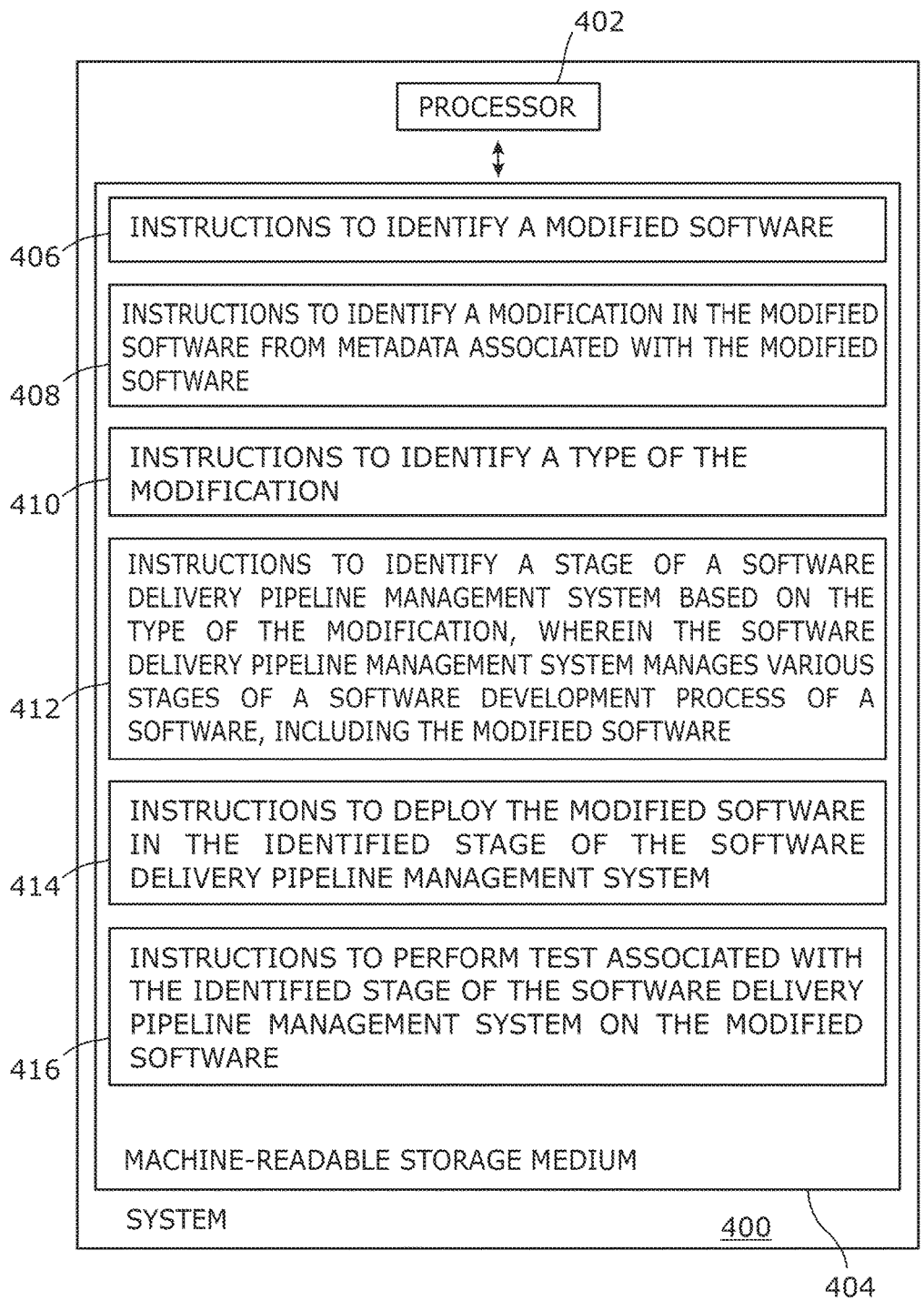
FIG. 4 is a block diagram of an example system including instructions in a machine-readable storage medium for managing a software delivery pipeline.

FIG. 4 is a block diagram of an example system 400 including instructions in a machine-readable storage medium for managing a software delivery pipeline. System 400 includes a processor 402 and a machine-readable storage medium 404 communicatively coupled through a system bus. In some examples, system 400 may be analogous to software delivery pipeline management system 106 of FIG. 1 or system 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, 410, 412, 414, and 416. In an example, instructions 406 may be executed by processor 402 to identify a modified software. Instructions 408 may be executed by processor 402 to identify a modification in the modified software from metadata associated with the modified software. Instructions 410 may be executed by processor 402 to identify a type of the modification. Instructions 412 may be executed by processor 402 to identify a stage of a software delivery pipeline management system based on the type of the modification, wherein software delivery pipeline management system manages various stages of a software development process of software, including the modified software. Instructions 414 may be executed by processor 402 to deploy the modified software in the identified stage of software delivery pipeline management system. Instructions 416 may be executed by processor 402 to perform a test associated with the identified stage of software delivery pipeline management system on the modified software.

In an example, the instructions to deploy may include instructions to deploy the modified software from a current deployment stage to the identified stage of software delivery pipeline management system. In an example, the instructions to deploy may include instructions to bypass deployment of the modified software to stages prior to the identified stage in software delivery pipeline management system.

In an example, instructions to perform the test associated with the identified stage may include instructions to perform a test associated with a stage immediately succeeding the identified stage of software delivery pipeline management system on the modified software. In an example, instructions to perform the test associated with the identified stage may include instructions to perform a test associated with a stage immediately succeeding the identified stage of software delivery pipeline management system on the modified software.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method of performing tests of a modified software in a software delivery pipeline management system, comprising:

identifying, by the software delivery pipeline management system, the modified software, the software delivery pipeline management system comprising a plurality of stages arranged in a sequential order;

identifying, by the software delivery pipeline management system, a plurality of modifications in the modified software based on metadata associated with the modified software, wherein the metadata comprises a plurality of a pre-defined indications associated with multiple types of modifications;

identifying, by the software delivery pipeline management system, a plurality of types of the plurality of modifications based on the metadata;

identifying, by the software delivery pipeline management system, a second plurality of stages of the software delivery pipeline management system based on the plurality of types of the plurality of modifications, wherein the identified second plurality of stages is included in the plurality of stages of the software delivery pipeline management system, wherein the plurality of stages comprises at least a development stage, a quality assurance stage, and a production stage;

successively deploying, by the software delivery pipeline management system, the modified software through the second plurality of stages in the software delivery pipeline management system beginning with an earliest stage in the second plurality of stages; and performing, by the software delivery pipeline management system, tests associated with the second plurality of stages on the modified software, the performing comprising bypassing one or more tests associated with one or more stages prior to the second plurality of stages.

2. The method of claim 1, wherein the plurality of stages further comprises a performance testing stage, a security testing stage, and a staging stage.

3. The method of claim 1, wherein the metadata comprises a pre-defined comment related to the modification.

4. The method of claim 1, wherein the metadata comprises a plurality of pre-defined numerical codes associated with the plurality of modification types.

5. A system for performing tests of a modified software, comprising:

a hardware processor; and a non-transitory storage medium storing instructions, the instructions executable by the hardware processor to:

identify the modified software to be tested in a plurality of stages of a software delivery pipeline management system;

identify a plurality of modifications in the modified software based on metadata associated with the modified software, wherein the metadata comprises a plurality of a pre-defined indications associated with multiple types of modifications;

identify a plurality of types of the plurality of modifications based on the metadata;

identify a second plurality of stages of the software delivery pipeline management system based on the plurality of types of the plurality of modifications, wherein the identified second plurality of stages is included in the plurality of stages of the software delivery pipeline management system, wherein the plurality of stages comprises at least a development stage, a quality assurance stage, and a production stage;

successively deploy the modified software through the second plurality of stages in the software delivery pipeline management system beginning with an earliest stage in the second plurality of stages; and perform a plurality of tests associated with the second plurality of stages on the modified software, comprising bypassing one or more tests associated with one or more stages prior to the identified second plurality of stages.

6. The system of claim 5, wherein the metadata comprises a pre-defined comment related to the modification.

7. The system of claim 5, wherein the metadata comprises a plurality of pre-defined numerical codes associated with the plurality of modification types.

8. The system of claim 5, wherein the plurality of stages further comprises a performance testing stage, a security testing stage, and a staging stage.

9. A non-transitory machine-readable storage medium comprising instructions for performing tests of a modified software, the instructions executable by a processor to:

identify a modified software to be tested in a plurality of stages of a software delivery pipeline management system;

identify a plurality of modifications in the modified software based on metadata associated with the modified software, wherein the metadata comprises a plurality of a pre-defined indications associated with multiple types of modifications;

identify a plurality of types of the plurality of modifications based on the metadata;

identify a second plurality of stages of the software delivery pipeline management system based on the plurality of types of the plurality of modifications, wherein the identified second plurality of stages is included in the plurality of stages of the software delivery pipeline management system, wherein the plurality of stages comprises at least a development stage, a quality assurance stage, and a production stage;

successively deploy the modified software through the second plurality of stages in the software delivery pipeline management system beginning with an earliest stage in the second plurality of stages; and perform a plurality of tests associated with the identified second plurality of stages of the software delivery pipeline management system on the modified software, comprising a bypass of one or more tests associated with one or more stages prior to the identified second plurality of stages.

10. The storage medium of claim 9, wherein the plurality of stages further comprises a performance testing stage, a security testing stage, and a staging stage.

11. The storage medium of claim 9, wherein the metadata comprises a plurality of pre-defined numerical codes associated with the plurality of modification types.

* * * * *